(12) United States Patent  (10) Patent No.: US 8,132,485 B2
Maffeis  (45) Date of Patent: Mar. 13, 2012

(54) DEVICE TO TRANSFORM RECTILINEAR ALTERNATING MOTION INTO INTERMITTENT ROTARY MOTION

(75) Inventor: Giuseppe Maffeis, Roncadelle (IT)

(73) Assignee: Gimatic S.p.A., Roncadelle (Brescia) (ID)

( * ) Notice: Subject to any disclaimer, the term of this patent is extended or adjusted under 35 U.S.C. 154(b) by 932 days.

(21) Appl. No.: 12/135,365

(22) Filed: Jun. 9, 2008

(65) Prior Publication Data

US 2008/0314172 A1    Dec. 25, 2008

(30) Foreign Application Priority Data

Jun. 19, 2007 (IT) .................. BS 2007 A 000084

(51) Int. Cl.
*B23Q 16/02* (2006.01)
(52) U.S. Cl. ............. 74/813 R; 74/817; 74/129; 408/70
(58) Field of Classification Search ............... 74/813 R, 74/817, 820, 129; 408/70, 71; 29/48.5 R
See application file for complete search history.

(56) References Cited

U.S. PATENT DOCUMENTS

| 3,580,111 A | * | 5/1971 | Tyrner | 74/817 |
| 3,977,263 A | * | 8/1976 | Nara | 74/129 |
| 5,819,586 A | * | 10/1998 | Butcher | 74/129 |

FOREIGN PATENT DOCUMENTS

JP           645754      *  1/1989
* cited by examiner

*Primary Examiner* — Alicia Torres
(74) *Attorney, Agent, or Firm* — McGlew and Tuttle, P.C.

(57) ABSTRACT

A device for transforming alternating rectilinear motion into intermittent rotary motion, in particular for the command of indexed rotary tables. The device includes at least one fixed base element (11) with cam guide elements (14), a moving slide element (12) associated with the fixed element, equipped with mechanical locator elements (15) following the cam guide elements (14) and susceptible to alternating movements on and with respect to the fixed base element commanded by an actuator, and an index plate (13) rotatably associated with the fixed element, interacting mechanically with the moving slide element (12) and susceptible to angular rotation pitch in answer to the alternating movements of the moving slide element. The index plate is connected to an indexed rotary table to be commanded.

8 Claims, 3 Drawing Sheets

DEVICE TO TRANSFORM RECTILINEAR ALTERNATING MOTION INTO INTERMITTENT ROTARY MOTION

FIELD OF THE INVENTION

This invention concerns a device for converting alternating rectilinear motion into intermittent rotary motion and for use in particular, but not exclusively, to power indexing rotary tables, that is rotary tables to be divided with any number of fixed divisions.

STATE OF THE TECHNIQUE

For example, equipments for mechanical operations or machining, such as assembly systems, testing, positioning, orientation or items advance step by step, spacers, etc. may require repetitive angular movement to achieve which, indexing rotary tables are used that is powered rotary tables to be divided.

OBJECTS AND SUMMARY OF THE INVENTION

This invention has been devised precisely for the operation of this type of rotary tables starting from a linear actuator device that can be pneumatic, mechanical, electro mechanic or something similar.

The main object of the invention is therefore to provide a device for transforming alternative rectilinear motion into intermittent rotary motion which is as simple as possible and at a minimum cost and which is flat with minimum overall dimensions, comprising a limited number of simply configured components which, above all and advantageously, can also be produced using the sinterisation process.

The device of this invention provide in fact a device which comprises at least one fixed base element with a face having cam guide means, a moving slide element associated with said face of the fixed base element, equipped with mechanical locator means following said cam guide means and susceptible to alternating movements on and with respect to said fixed base element actuated by an actuator, and an index plate rotatably associated with said fixed base element, interacting mechanically with the moving slide element and susceptible to angular rotation pitch in response to the alternating movements of said moving slide element, said index plate being connected to an indexed rotary table to be commanded.

Furthermore, according to the invention a same device can be used with either a clockwise or an anticlockwise output rotation by simply turning it through 180°.

BRIEF DESCRIPTION OF THE DRAWINGS

The present device, however, will be described in greater detail in the continuation making reference to the purely indicative schematic drawings attached, in which.

DETAILED DESCRIPTION OF THE INVENTION

In the example illustrated, the device is set up to establish a complete turn of a rotary table divided into four equal zones or equal angular intervals, each one 90°. It is evident however that the device can also be set up, according to needs, for any other number of divisions of a complete turn of a graduated rotary table.

Figure 1:
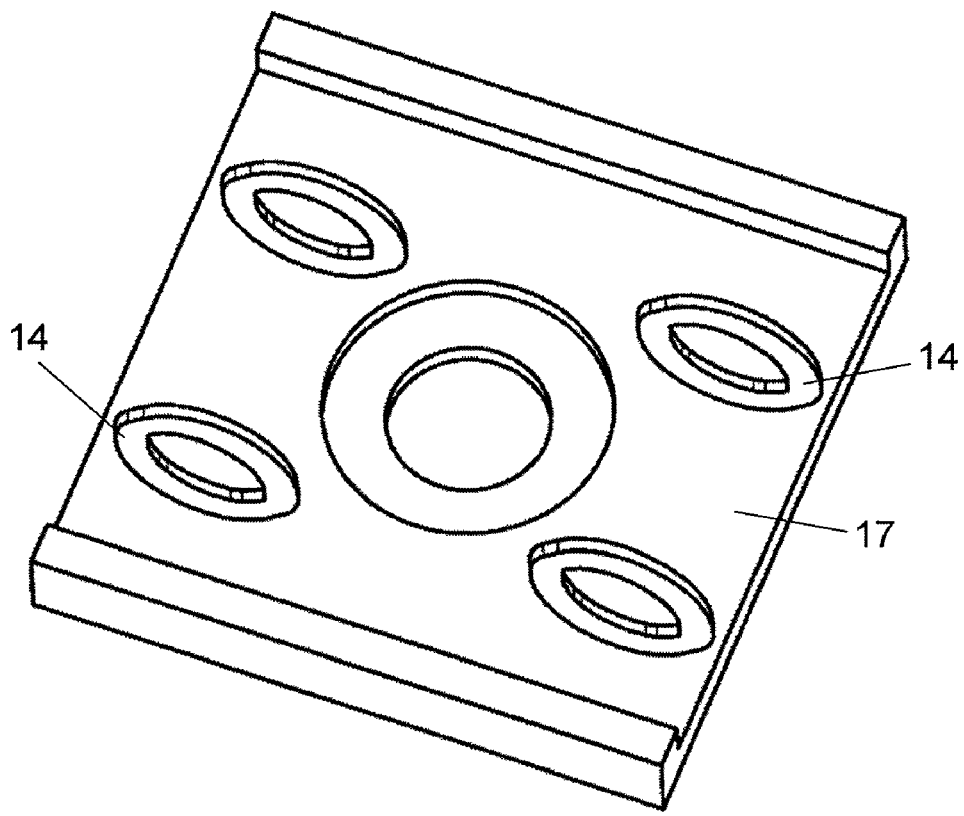
FIG. 1 shows an exploded view of the fundamental components of the device.

As shown in FIG. 1, the device basically comprises at least a fixed base element 11, a moving slide element 12, and an index plate 13 to which an indexed rotary table is then constrained coaxially—not shown.

The base element 11 has at least an internal flat face, and this face is equipped with cam guide means 14, which, in the example shown are four, positioned according to the apexes of a quadrilateral, each in the shape of an endless groove.

The moving slide element 12 is positioned and sliding on the internal face of the fixed base element 11 and is equipped with mechanical locator means 15, positioned so that each one is located in a corresponding cam guide 14 of said base element. The slide element 12 is connected and controlled by an actuator—not shown—that can be pneumatic, mechanical, electromechanical or suchlike. The connection is such that the slide element 12 is susceptible to carrying out alternative longitudinal X moves accompanied by a translation in the Y transversal direction, corresponding to the shape of the cam guides 14 they are slotted into and in which the mechanical locators 15 slide in.

Each of said locator means 15 can be made up of a peg or, better, by a roller or rolling bearing, fixed to the slide element 12 and constrained in the respective cam guide 14 to minimize the coupling friction, volvent friction being present when each locating means is a roller or rolling bearing.

The slide element 12 in addition has a window 16 in two opposite sides, parallel to the longitudinal movement direction X, are provided two recesses 17, which are open towards the centre of said window and each having a carefully shaped entry.

Figure 5:
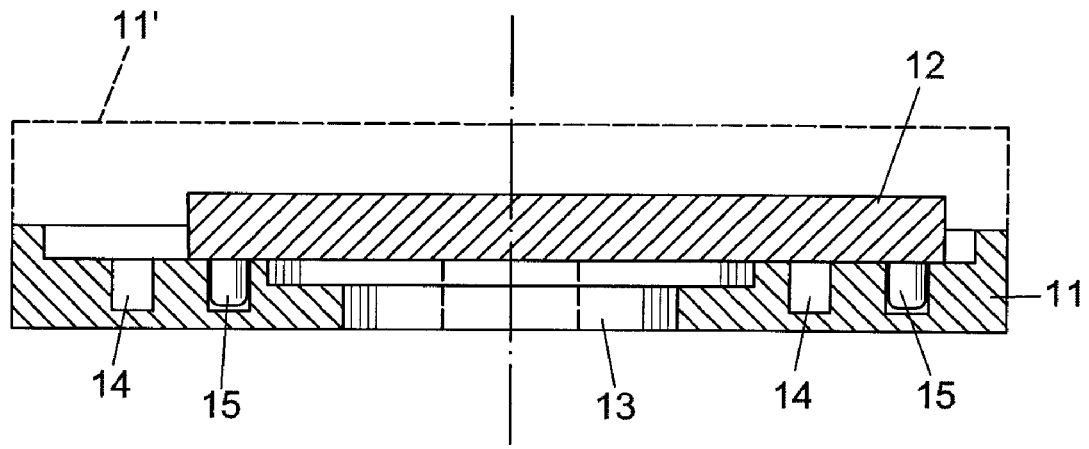
FIGS. 5 and 6 show the enlarged transversal sections according to arrows A-A and B-B, respectively, shown in FIG. 2.
Figure 6:
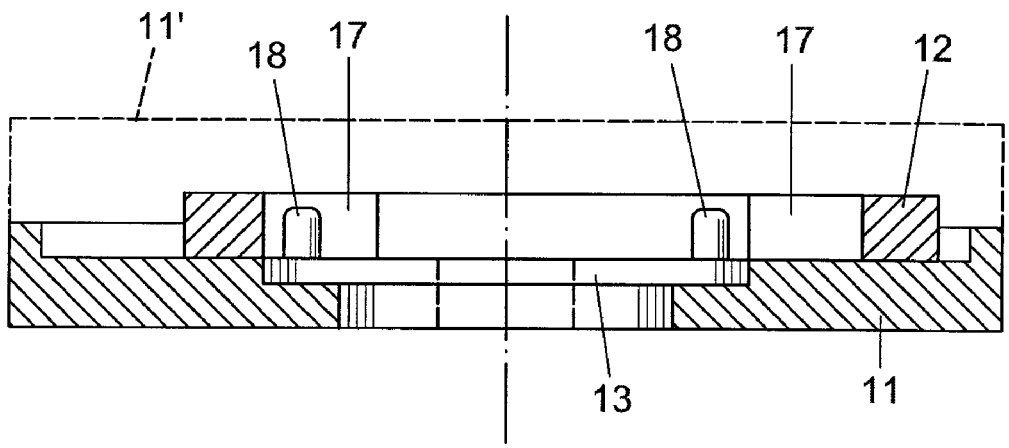

The index plate 13 is supported and turns in the fixed base element 11 and is provided, on one of its planes, with drag elements 18, which the example shown are four for the four divisions of a turn. They are designed to engage one at a time with a recess 17 of the slide element 12 in answer to the alternating moves of the latter. Said drag elements 18 can be pegs or, better, rollers or bearings in order to minimize the coupling friction. In one construction variation, even though not shown, the device can include two fixed elements 11, 11', superimposed like a base and cover elements—FIGS. 5 and 6—forming a chamber between them. The slide element 12 is in this case positioned and moveable in said chamber and driven, by means of the relative pegs or rollers, in cam guides provided in one, or even in both the superimposed fixed elements.

The index plate 13 can be supported between the two coupled fixed elements and will however find itself interacting, by means of its pegs or rollers 18, with the slide element 12 in the same way as described above.

Figure 2:
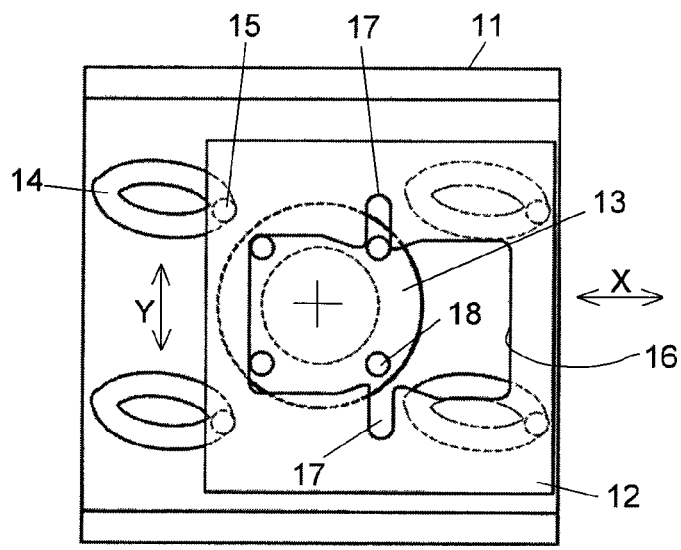
FIG. 2 shows a plan view of the device in the start position for a rotation of a fraction of a turn, that is for a preset distance, of a rotary table.
Figure 3:
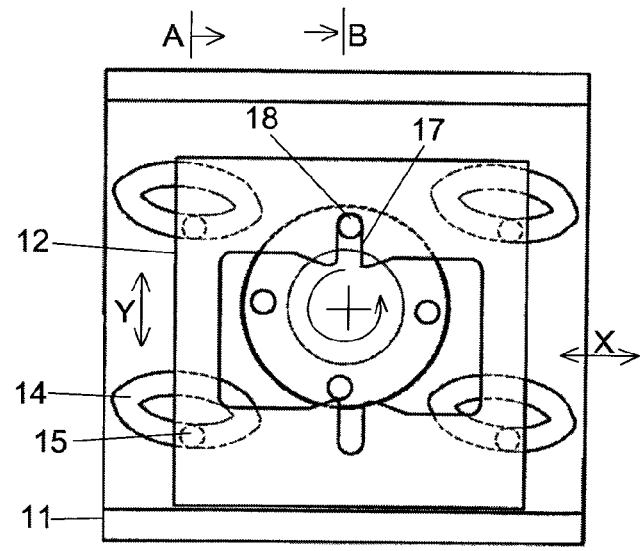
FIGS. 3 and 4 show a similar plan view of the device, but in an intermediate phase and on completion of the turn of a complete pitch of the rotary table.
Figure 4:
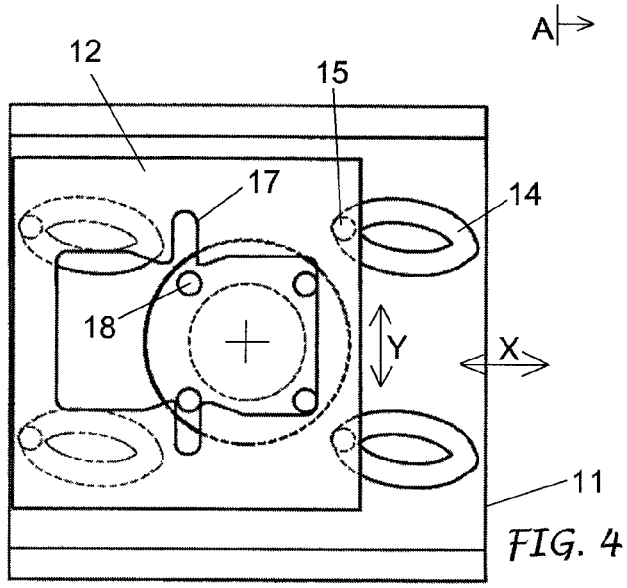

In any case, and as appears evident from FIGS. 1-3, the forward and return strokes of the slide element 12, whose pegs, rollers or bearings 15 are obliged to follow the cam guides 14, coincide with an intermittent rotation of the index plate 13 and consequently of the indexing rotary table which can be connected to it, each time at an angle corresponding to the angular distance between the pegs or rollers or bearings of said index plate. Therefore, by varying the number of pegs, rollers or bearings of said table and their angular distance, a complete turn of the powered indexing table can be divided into any number.

The invention claimed is:

1. A device for transforming alternating rectilinear motion into intermittent rotary motion, comprising:
    at least one fixed base element with a face having a cam guide means;
    a moving slide element associated with said face of the fixed element, equipped with a mechanical locator means following said cam guide means and susceptible to alternating movements on and with respect to said fixed base element; and
    an index plate rotatably associated with said fixed base element, interacting mechanically with the moving slide element and susceptible to angular rotation pitch in response to the alternating movements of said moving slide element, said index plate being connected to an indexed rotary table to be commanded, wherein the cam guide means of the fixed base element is in the shape of endless grooving, and the mechanical locator means of the moving slide element is compelled to follow said cam guide means.

2. Device according to claim 1, wherein the moving slide element has two recesses facing and opening towards an intermediate window, and the index plate has a number of drag elements angularly spaced, engaging one at a time with one of said recesses to cause the index plate to rotate due to the movements of the moving slide element.

3. Device according to claim 2, wherein the drag elements of the index plate comprises pegs.

4. Device according to claim 2, wherein the drag elements of the index plate comprises rollers or bearings.

5. Device according to claim 1, wherein the moving slide element is connected to one of a pneumatic actuator, a mechanical and an electro-mechanical actuator to cause the alternating movements corresponding to intermittent rotations of the index plate.

6. Device according to claim 1, wherein the moving slide element is positioned and constrained between two superimposed fixed elements.

7. A device for transforming alternating rectilinear motion into intermittent rotary motion, comprising:
    at least one fixed base element with a face having a cam guide means;
    a moving slide element associated with said face of the fixed element, said moving slide element comprising a mechanical locator means following said cam guide means and susceptible to alternating movements on and with respect to said fixed base element; and
    an index plate rotatably associated with said fixed base element, interacting mechanically with the moving slide element and susceptible to angular rotation pitch in response to the alternating movements of said moving slide element, said index plate being connected to an indexed rotary table to be commanded, wherein the cam guide means of the fixed base element is in the shape of endless grooving, and the mechanical locator means of the moving slide element is compelled to follow said cam guide means, said mechanical locator means comprising pegs.

8. A device for transforming alternating rectilinear motion into intermittent rotary motion, comprising:
    at least one fixed base element with a face having a cam guide means;
    a moving slide element associated with said face of the fixed element, said moving slide element comprising a mechanical locator means following said cam guide means and susceptible to alternating movements on and with respect to said fixed base element; and
    an index plate rotatably associated with said fixed base element, interacting mechanically with the moving slide element and susceptible to angular rotation pitch in response to the alternating movements of said moving slide element, said index plate being connected to an indexed rotary table to be commanded, wherein the cam guide means of the fixed base element is in the shape of endless grooving, and the mechanical locator means of the moving slide element is compelled to follow said cam guide means, said mechanical locator means comprising rollers or bearings.

* * * * *